United States Patent [19]

Smith

[11] Patent Number: 5,185,692
[45] Date of Patent: Feb. 9, 1993

[54] COMPUTER SECURITY DEVICE HAVING CONNECTOR WITH SPRING LOADED CONTACT MEMBERS

[76] Inventor: James D. Smith, 4420 Rosemont Ave., Drexel Hill, Pa. 19026

[21] Appl. No.: 707,667

[22] Filed: May 30, 1991

[51] Int. Cl.⁵ .................... H05K 7/10; H01R 23/02; H01R 23/70; H01R 33/96
[52] U.S. Cl. .................... 361/393; 361/380; 361/391; 361/394; 361/413; 200/51.09; 200/51.13; 439/188
[58] Field of Search ............... 200/43.02, 43.05, 43.06, 200/51 R, 51.07, 51.08, 51.09, 51.11, 51.12, 51.13; 439/188; 361/335, 336, 338, 340, 380, 392, 394, 395, 399, 391, 413, 393, 396

[56] References Cited

U.S. PATENT DOCUMENTS

| | | | |
|---|---|---|---|
| 3,193,635 | 7/1965 | Hood, Jr. | 200/51.09 X |
| 3,409,857 | 11/1968 | O'Neill et al. | |
| 3,729,657 | 4/1973 | Callan et al. | 361/399 X |
| 3,818,280 | 6/1974 | Smith et al. | 361/415 X |
| 3,973,817 | 8/1976 | Stalley et al. | 361/399 X |
| 4,149,027 | 4/1979 | Ashen et al. | 361/399 X |
| 4,179,179 | 12/1979 | Lowden | |
| 4,316,304 | 2/1982 | Parise et al. | 200/51.09 X |
| 4,562,306 | 12/1985 | Chou et al. | |
| 4,647,120 | 3/1987 | Karabakakis | 200/51.09 X |
| 4,694,492 | 9/1987 | Wirstrom et al. | 380/23 |
| 4,781,626 | 11/1988 | Lazarchik | 439/680 |
| 4,794,470 | 12/1988 | Lauffenburger et al. | 360/69 |
| 4,813,892 | 3/1989 | Strate | 439/681 |
| 4,833,554 | 5/1989 | Dalziel et al. | 360/98.04 |
| 5,019,947 | 5/1991 | Pelzl | 361/413 X |
| 5,070,430 | 12/1991 | Meusel et al. | 361/413 X |

Primary Examiner—Leo P. Picard
Assistant Examiner—Michael W. Phillips
Attorney, Agent, or Firm—William H. Murray; Robert E. Rosenthal

[57] ABSTRACT

A system for restricting insertion removable disk drives in a computer to identified disk drives, having female connectors in the computer and male connectors on the disk drive. Each male connector has engaging members in recessed slots between conductive surfaces. Each female connector has spring-loaded contact members which are adapted to be engaged by the engaging embers. Each contact member has a first conductive area on one side which comes in electrical contact with a conductive surface of a male connector, and a second conductive area on an opposite side which is in electrical contact with the first conductive area. Contact connectors in the female connector are in continuous electrical connection to the computer. When an identified disk drive is inserted, the contact members are pushed back a predetermined distance so as to establish electrical contact between contact connectors and the second conductive areas.

6 Claims, 5 Drawing Sheets

_Fig. 6_

_Fig. 7_

COMPUTER SECURITY DEVICE HAVING CONNECTOR WITH SPRING LOADED CONTACT MEMBERS

BACKGROUND OF THE INVENTION

This invention relates to computer security devices. This invention relates more particularly to devices for preventing unauthorized users from obtaining access to a network. This invention also relates to connectors for computer hardware.

Networks of personal computers that can communicate with one another are extremely common in businesses, universities and other institutions. The principle of a network is that an operator using one personal computer in a network may obtain access to data or programs stored in any other computer in the network. Similarly, an operator may transmit data to any other computer in the network. Such access is extremely advantageous for the sharing of information among authorized users of such a network. Information may be transmitted much more quickly using a network than by storing data in a magnetic storage medium such as a disk and physically transporting the disk to another computer. However, such access also presents a disadvantage. Any person who successfully gains access to the network through any one personal computer attached to the network can then gain access to data contained elsewhere in the network. This presents the danger of unauthorized users obtaining confidential information. A person who gains access to a single computer in a large network may have the ability to review any confidential information in any computer that is part of the network. Thus, trade secrets, business plans, and other secret information could be obtained by competitors. Moreover, unauthorized users may engage in sabotage of any computer connected to the network. Data that is essential to business operations or research could be altered or destroyed.

A large number of schemes that employ software techniques have been developed to prevent unauthorized users from gaining access to networks. Under such software-based schemes, users requiring access to a particular codes or particular programs must enter a password in order to gain access to the network. One method of circumvention is to boot a workstation or the file server with a floppy disk containing a booting program, which is inserted into the "A" drive of a personal computer attached to the network. The network server or the workstation is then booted with the appropriate operating system. Once the network server or workstation has been booted, various utility programs are then used to obtain access to the system. Once access is gained, any software, data or programs may be easily, and often undetectably, copied. Thus unauthorized users may obtain sensitive information.

Passwords are often written down by authorized users, verbalized to co-workers or forgotten. With the proper password even an authorized user may remove sensitive data or programs. In addition, passwords do not protect the network from a user loading programs from home or other sources that may contain a software virus.

One solution to this problem is the removal of the "A" drive from all the computers in the network when not in use. Disk drives are available that can easily slide in and out of position. Organizations may mandate that, whenever a computer is not in use, the "A" drives be stored in a secure place, so as to prevent use of the "A" drive to boot the network server or workstation. Alternatively, the organization may require that the computer be run without an "A" drive, except when needed, for example, to update software. However, these "A" drives are generally of standard manufacture. Accordingly, it is a fairly simple matter for an unauthorized user to obtain a standard removable disk drive, and insert it into the appropriate position in the personal computer.

Accordingly, it is an object of this invention to provide a system for restricting access to a personal computer to authorized users.

It is a further object of this invention to provide a system for restricting access to a personal computer having a removable disk drive.

It is a further object of this invention to provide a system for protecting the security of a personal computer and a network in communication with such a personal computer whereby only the particular disk drive that matches to that personal computer can be used for obtaining access to the personal computer and its associated network.

It is a still further object of this invention to provide a combination of a personal computer and a disk drive wherein only that particular disk drive may be inserted into that computer.

It is a further object of this invention to provide connectors for computer hardware units, whereby only those hardware units having identified matching connectors may be connected to a particular hardware unit.

SUMMARY OF THE INVENTION

A system for allowing only identified first computer hardware units to be connected to a second computer hardware unit includes a male connector on each identified first computer hardware unit and a female connector on each second computer hardware unit. Each male connector has engaging members, each at a predetermined position from the front of the male connector, which set of predetermined positions identifies each of the first computer hardware units. The female connector has spring-loaded contact members, each of which is located so as to be engaged by one of the engaging members, wherein electrical contact between one of the first computer hardware units and the second computer hardware unit is established only when each of the spring-loaded protrusions is moved a predetermined distance by one of the engaging members.

A hardware unit has a male connector having engaging members, each at a predetermined position in the direction of insertion of the male connector, the predetermined positions being chosen for adaptation of the male connector to establish electrical contact when inserted in female connectors in one or more other hardware units.

A system for allowing only identified first hardware units to be connected to a second hardware unit has a male connector and a female connector. The male connector is a substantially flat board having conductive surfaces on at least one side thereof and keying slots in the board, the keying slots being of varying, predetermined lengths. The female connector has connectors, each corresponding to one of the conductive surfaces, and rigid protrusions between pairs of adjacent connectors. These protrusions are dimensioned so as to fit in the keying slots, the length of each protrusion corresponding to the length of a corresponding keying slot.

DETAILED DESCRIPTION OF THE PREFERRED EMBODIMENT

Figure 1:
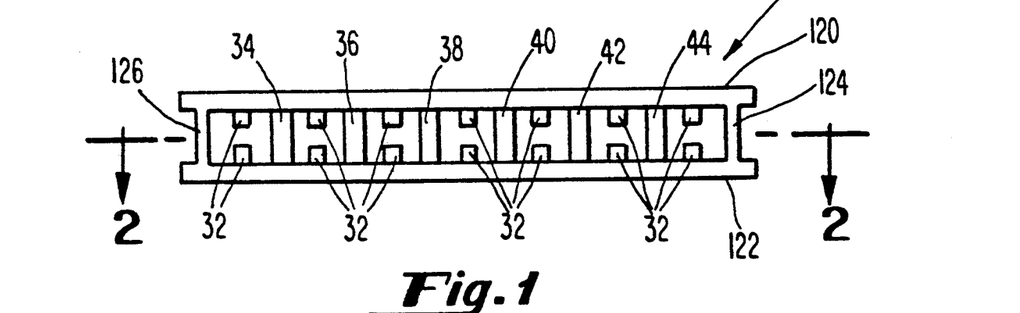
FIG. 1 is a front plan view of a female connector in a computer security device according to one embodiment of the invention.

FIG. 1 is a front plan view of a female connector 30 according to an embodiment of the invention. Female connector 30 has a planar top wall 120, a planar bottom wall 122 parallel to top wall 120, a planar right side wall 124, and planar left side wall 126 extending between top wall 120 and bottom wall 122, and planar left side wall 126 extending between top wall 120 and bottom wall 122 opposite to right side wall 124. Planar keying projections 34, 36, 38, 40, 42, and 44 are disposed at equal intervals parallel to and between right side wall 124 and left side wall 126. Disposed on bottom wall 122 and top wall 120, between each pair of keying projections, and between each side wall and the nearest keying projection, are conductors 32. Each conductor 32 may be a spring-loaded metal contact. Such springloaded contacts are well-known in standard sockets for edge connectors.

Figure 2:
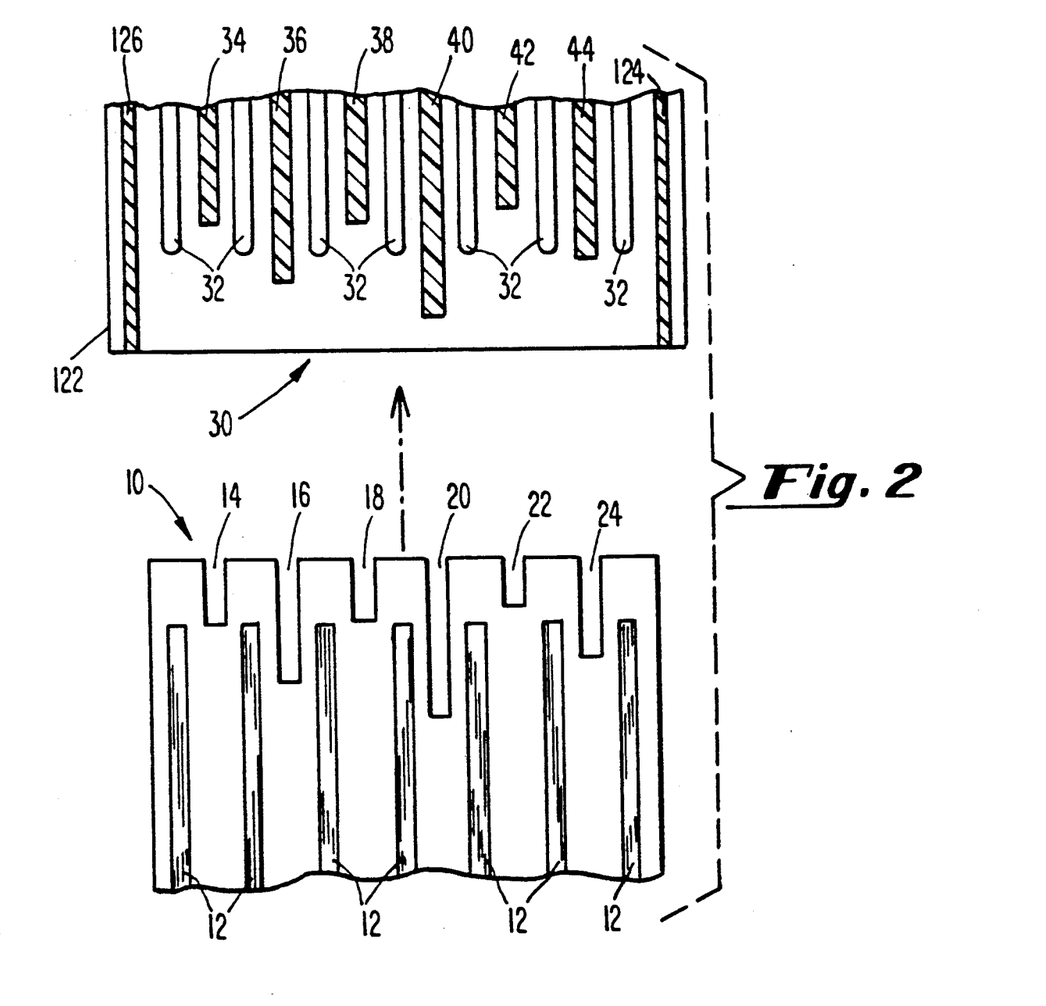
FIG. 2 is a plan view of a computer security device according to the embodiment of FIG. 1, including a partial sectional view along line 2—2 of FIG. 1.

FIG. 2 is a sectional plan view, taken along line 2—2 of FIG. 1, of a computer security device according to an embodiment of the invention. The lower portion of FIG. 2 shows male connector 10. Male connector 10 may be made of a standard material used for circuit boards. For example, male connector 10 may be an edge of a circuit board, which may be FR-4 board, a fire-resistant bonded fiberglass. The top surface of male connector 10 has conductor surfaces 12 coated with a conductive material, as is well known in the art. Conductor surfaces 12 may be conventional conductors provided in edge connectors for circuit boards. Each conductor surface 12 is consequently substantially rectangular in shape, and much longer in one dimension than in the other. The long sides of each conductor surface 12 are all substantially parallel. The lower surface (not shown) of male connector 10 may also have such conductor surfaces 12, as is well known in the art. Between each pair of adjacent conductor surfaces 12 is one of a number of keying slots 14, 16, 18, 20, 22, and 24. Each of these keying slots is a substantially rectangular portion of the male connector 10 Which has been removed.

The upper portion of FIG. 2 shows a sectional plan view, taken along line 2—2 of FIG. 1, of a female connector 30 according to the invention. A lower row of spring-loaded contacts 32 is shown. Each of these spring-loaded contacts 32 is recessed within the female connector 30 away from the forward edge of the female connector 30. Each spring-loaded contact 32 corresponds to a conductor 12 in the male connector 10. Between each pair of adjacent spring-loaded contacts 32 is one of the keying projections 34, 36, 38, 40, 42, and 44. Each keying projection extends forward of the spring-loaded contacts. Each keying projection corresponds in length to one of the keying slots 14, 16, 18, 20, 22, and 24, in the male connector. When the male connector is pushed into the female connector 30, each of the keying projections slides into an appropriate keying slot.

If the proper male connector 10 is used, the male connector will slide into the female connector to the point where the male conductors 12 will be engaged by the spring-loaded contacts 32. However, if any other male connector is used, one of the keying projections will block its insertion into the female connector. As a result, the conducting surfaces 12 of the male connector will not be engaged by the spring-loaded contacts 32 of the female connector. It will readily be seen that the male connector may be disposed on a standard removable disk drive, with the female connector disposed within the body of the computer. Thus, only a disk drive that has a male connector having the proper configuration of keying slots can be inserted into the computer.

Figure 3:
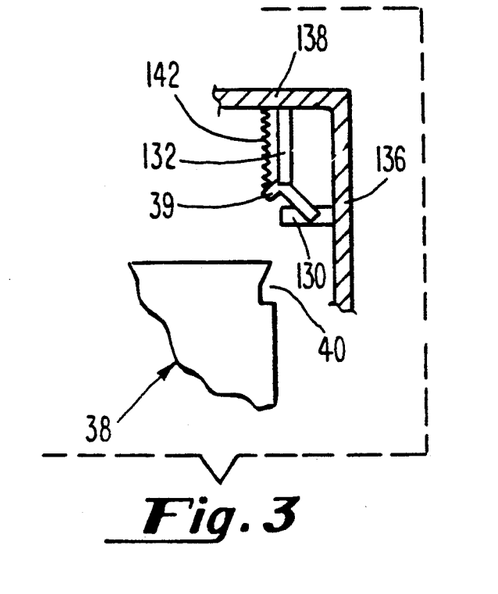
FIG. 3 is a top plan view of an optional feature of a computer security device according to the embodiment of FIGS. 1 and 2.
Figure 4:
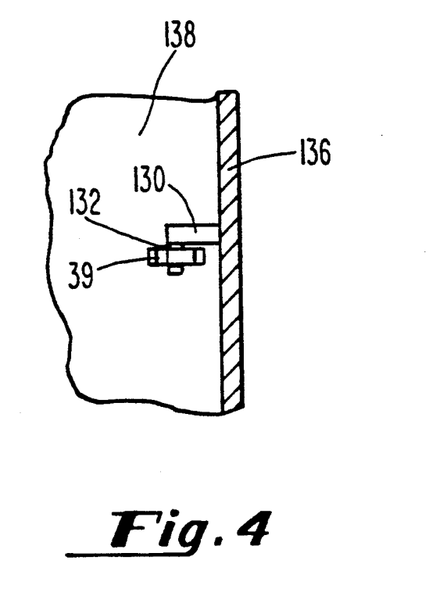
FIG. 4 is a front view of a portion of the embodiment of the invention depicted in FIG. 3.
Figure 5:
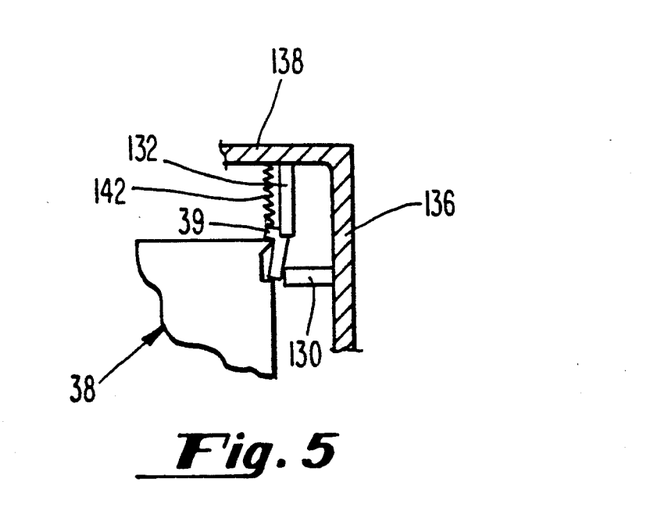
FIG. 5 is a top plan view of the embodiment of the invention depicted in FIG. 3.

FIGS. 3, 4 and 5 illustrate a further possible feature of the invention according to the embodiment of FIGS. 1 and 2. It is well known in the art of computer manufacture to provide a chassis for a computer in the form of a box that has a top wall, two sidewalls, a front wall, and a rear wall, and lacks a bottom. The computer chassis may be lifted to expose the hardware of the computer for servicing. One method of tampering with a computer is to remove the computer chassis and then manipulate or alter the hardware. The structure of FIGS. 3, 4 and 5 has the purpose of preventing the removal of the chassis of the computer. The view of FIG. 3 is looking downward from the interior of the chassis. With reference to FIG. 3, there is shown a housing for a disk drive 38. The rear of the drive housing 38 is toward the top of FIG. 3. Sidewall 136 of the computer chassis and rear wall 138 of the computer chassis are shown. The drive housing 38 may be, as is conventional, substantially rectangular. A catch 40 is provided in the drive housing 38. Catch 40 is an indentation provided in the side of drive housing 38. A spring-loaded L-shaped lever 39 is provided rotatably mounted on bracket 132 by means of a vertical pin (not shown). Bracket 132 extends forward from rear wall 138. Projecting boss 140 extends inward from sidewall 136 below lever 39. Projecting boss 130 may be of metal and may be welded to sidewall 136.

Spring 142 is attached at one end to the shorter leg of L-shaped lever 39 and at an opposite end to rear wall 138 of the computer chassis. Spring 142 is under tension; therefore, lever 39 remains in the position indicated in FIGS. 3 and 4. As may be seen, the computer chassis may not be lifted up and removed, as projecting boss 130 will be blocked by the longer leg of L-shaped lever 39. FIG. 5 illustrates the configuration when a proper drive is inserted. The rear corner of the drive pushes the shorter leg of lever 39 rearward. The longer leg of lever 39 then is moved toward the side of the drive housing 38. When a proper drive is inserted, as illustrated in FIG. 5, the longer leg of the L-shaped lever 39 will rotate until it is recessed into catch 40 on drive housing 38. The longer leg of the L-shaped lever 39 will then be clear of the projecting boss 140, and this structure will not be an impediment to removal of the computer chassis. When a connector structure according to the embodiment of FIGS. 1 and 2 is employed, and an improper male connector is mounted on the drive, it will not be possible to insert drive 38 completely; then the lever 39 will not be rotated far enough to clear the projecting boss 140. As a result, it will not be possible to remove the computer chassis. In this manner, tampering by removing the chassis may be prevented.

Figure 6:
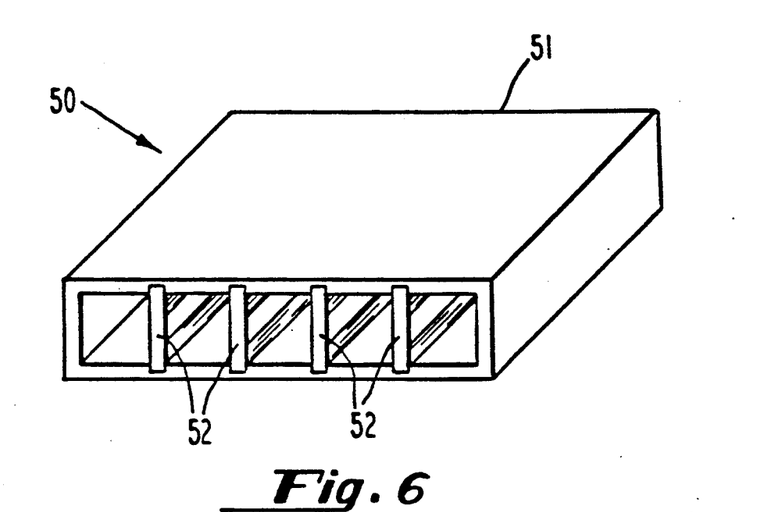
FIG. 6 is a perspective view of a connector of a computer security device according to an alternate embodiment of the invention.
Figure 7:
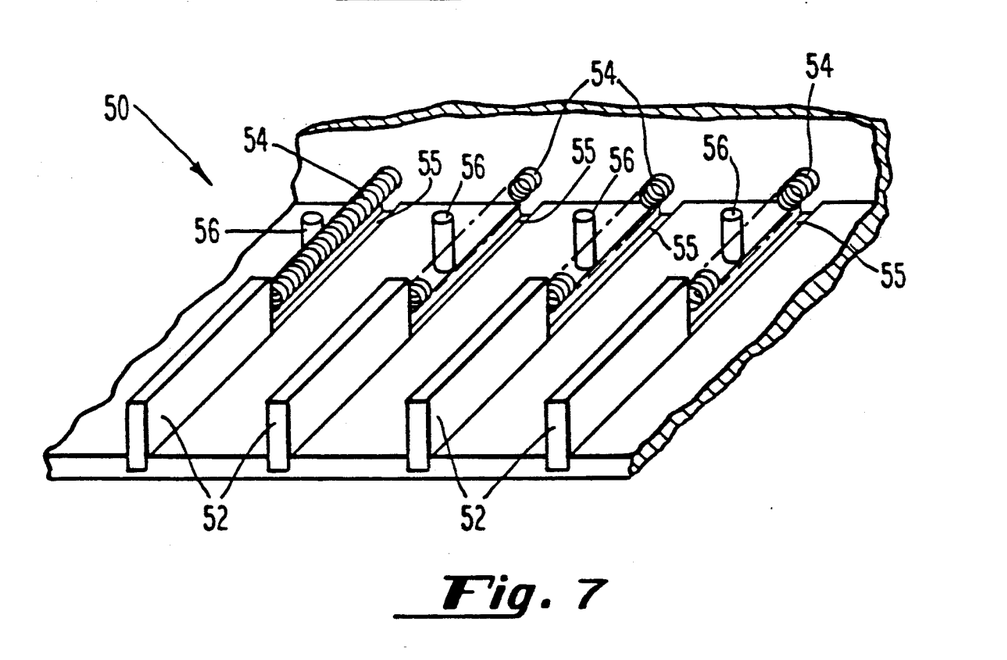
FIG. 7 is an exploded perspective view of the connector depicted in FIG. 6.

With reference to FIGS. 6 through 9, there is shown an alternative embodiment of the invention. FIG. 6 is a perspective view of a female connector 50 according to the invention. The female connector has a rectangular housing 51 with an open face. Contact members 52 are visible through the open face. FIG. 7 is an exploded perspective view of a female connector 50 according to the invention. In the female connector, there are shown a number of contact members 52. In this view, it will be seen that each contact member 52 is a substantially flat rectangular member. For ease of illustration, four contact members are shown. However, any number of such contact members may be provided. Each of these is attached at its rear edge to a spring 54. Each contact member 52 rides in a slot 55. Thus, the front edge of each contact member 52 is located at the face of the female connector when no force is applied. When a force is applied, the contact member moves back in slot 55. Directly adjacent to each slot 55 is a contact connector 56. Each contact connector 56 is electrically connected through appropriate cables, to the remainder of the computer (not shown).

Figure 8:
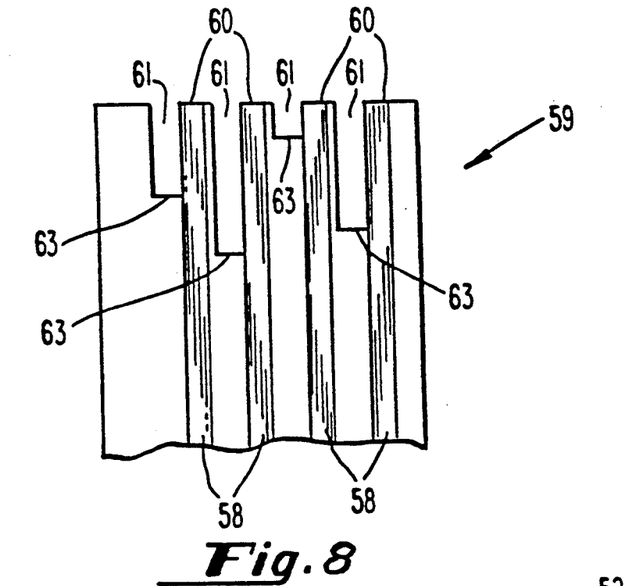
FIG. 8 is a plan view of a connector according to the embodiment of FIG. 6.

FIG. 8 is a plan view of a male connector 59. Male connector 59 may be an edge of a circuit board, as in the embodiment of FIG. 1. The male connector includes a number of protrusions 60. Each protrusion includes a surface 58 coated with a conductive material, as is conventional in the art. Each surface 58 is in electrical contact with the hardware unit on which the male connector 59 is mounted. A keying slot 61 is located between each pair of protrusions 60. The rear surface 63 of each keying slot will be referred to as an "engaging member." The portion of the male connector 59 at the top of the figure is referred to as the front. Each engaging member is disposed a predetermined distance from the front of the male connector. Each protrusion is coated with a conductive material on one side so that the side is in electrical contact with the adjacent surface 58. Accordingly, one side of each protrusion is in electrical contact with the remainder of the hardware unit on which the male connector is mounted.

Figure 9:
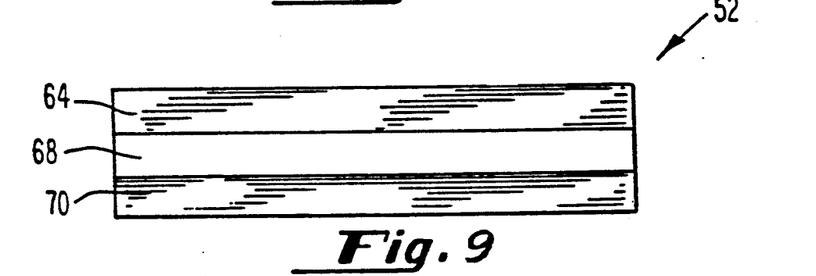
FIG. 9 is a side view of a spring-loaded protrusion in a connector depicted in FIG. 7.

FIG. 9 is a view of the right side, referenced to the view depicted in FIG. 7, of one of the spring-loaded contact members 52. It will be seen that the side is divided into three sections. The top portion, marked 64, is coated with an electrically conductive material. The central portion, 68, is not coated. The bottom portion, 70, is also coated with an electrically conductive material. The top and bottom portions are electrically insulated from one another.

Figure 10:
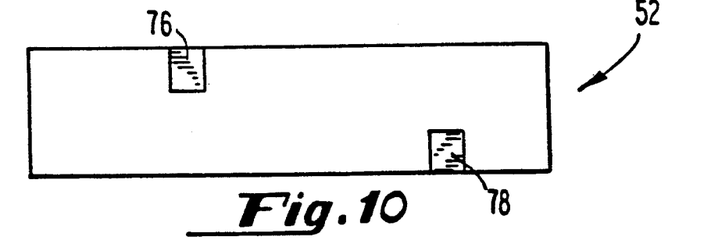
FIG. 10 is a side view of a spring-loaded protrusion opposite to the view depicted in FIG. 9.

FIG. 10 is a view of the left side, referenced to the view depicted in FIG. 7, of one of the spring-loaded contact members 52. A top portion of the spring-loaded contact member 52 includes an area 76 that is coated with an electrically conductive material. This area 76 is electrically connected to the top portion 64 in FIG. 4, on the opposite side of the contact member. A bottom portion of the left side includes an area 78 that is coated with an electrically conductive material. This area 78 is electrically connected to the lower portion 70, (shown in FIG. 4) on the opposite side of the contact member.

When the male connector depicted in FIG. 8 is inserted in the female connector depicted in FIGS. 6, 7, 9 and 10, an engaging member 63 will be aligned with each contact member 52. As the male connector is inserted further into the female connector, engaging members 63 will begin to engage contact members 52. As each contact member 52 is engaged by an engaging member 63, the contact member is pushed away from the face of the female connector. If the engaging member is in the proper position, upon complete insertion, the electrically conductive area 78 will be directly adjacent to contact connector 56. Similarly, conductive area 74 will be in contact with a connector on the upper part of the female connector. Thus, the corresponding conductive surface 58 on the male connector will be in electrical connection with the computer through the contact connector 52, area 78, and portion 70 on the contact member.

The conductive area 78 may be placed at any location between the rear and front of the lower portion of the left side of contact member 52. The depth of the keying slot 61, and hence the position of the engaging member 63, depends on the location of the area 78. The position of the engaging member is selected so that, when the male and female connectors are fully pushed together, the contact connector 52 and area 78 will be adjacent. If the slot 61 is too shallow, the engaging member will be too far forward in the male connector. Then area 78 will move beyond the contact connector 52. As a result, the hardware unit on which the male connector is mounted will not be operable with the hardware unit in which the female connector is mounted. If the engaging member 63 is too far back in the male connector, area 78 will be forward of the contact connector. As a result, again, the two hardware units will not operate together.

It will easily be feasible for a manufacturer of such devices to provide a very large number of combinations of locations of contacts. A manufacturer may make, for example, computers with female connectors according to the invention mounted for connection of removable disk drives. The manufacturer will also provide a disk drive, corresponding to each computer, having a male connector according to the invention for connection with the female connector mounted on the computer. Thus each disk drive will be identified by the positions of its engaging members. The chance of randomly producing a drive that can be used with a computer equipped with this system will be extremely small. Conductive areas will desirably be small in relation to the length of travel of the contact member. This will make numerous combinations available. However in systems with a large number of bits, even a length of travel of two or three times the length of the conductive area will provide a very large number of combinations. Thus, an unauthorized user would not be in possession of a disk drive that could be substituted for a removed disk drive.

Figure 11:
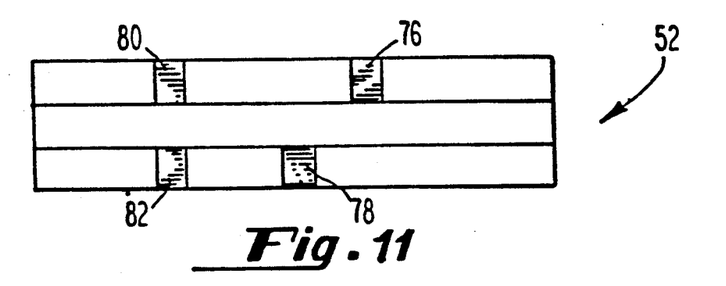
FIG. 11 is a side view of an alternative embodiment of a spring-loaded protrusion.

FIG. 11 depicts an alternative embodiment of the left side of one of the spring-loaded contact members 52. As in FIG. 10, there is an area 76 coated with an electrically conductive material and an area 78 coated with an electrically conductive material. It will be seen that a second top conductive area 80 is provided along a top portion in addition to conductive area 78. A second bottom conductive area is provided along a bottom portion in addition to conductive area 78. As a result, more than one male connector may be used to provide electrical contact. In practice, a master disk drive may be provided. Thus, for example, a manager may have a master disk drive, which may be used in the computer of any employee under the manager's supervision. Of course, more than two conductive areas may be provided along the top and bottom. Thus, several levels of access may be provided. A manager of a single department may have a disk drive for use in any computer in that department but not for use in computers in other departments. A manager of several departments may have a disk drive for use in any computer in any of those departments.

Figure 12:
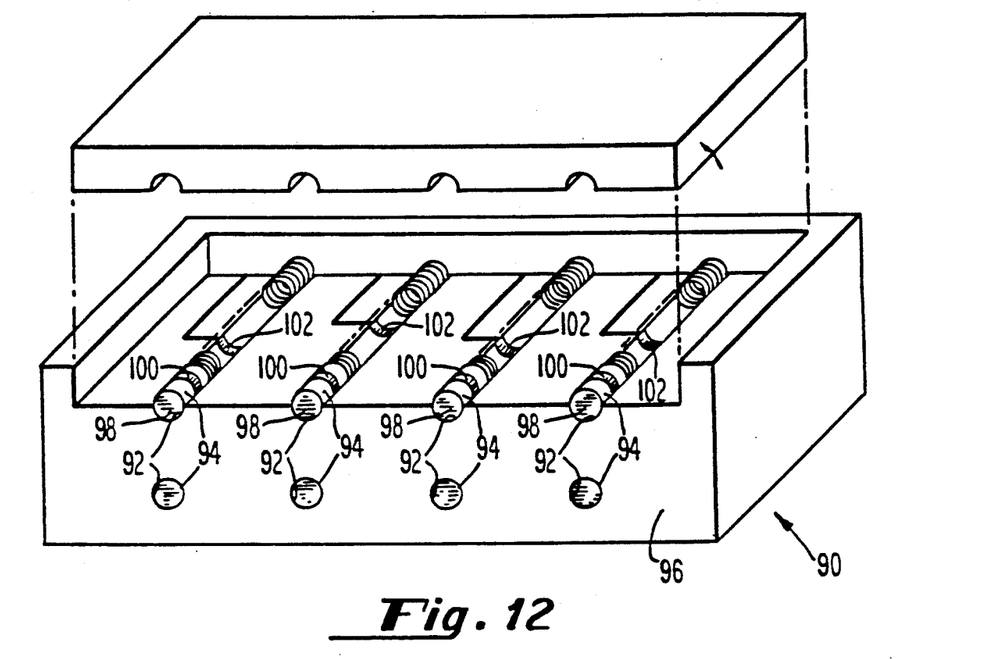
FIG. 12 is an exploded perspective view of a connector according to an alternate embodiment of the invention.

FIG. 12 is an alternative embodiment of the invention. As is well know in the art, male connectors may be provided that have a number of pins. The pins are inserted into corresponding holes in a female connector or socket. FIG. 12 illustrates a female connector 90 of this type in accordance with the invention. FIG. 12 is a partial sectional perspective view. Female connector 90 is in the form of a rectangular block. The rectangular form is merely for ease of illustration. Cylindrical holes 92 are provided in female connector 90, extending inward from face 96. Inside each hole 92 there is a cylindrical connector 94. Each connector 94 has a conductive forward end 98. This forward end 98 is the end toward face 96. Each connector 94 has at least one conductive area 100 along its length. Conductive area 100 is in electrical contact with conductive forward end 98. The remainder of the surface of the side of the connector 94 is not in electrical contact with conductive forward end 98. For example, connector 94 may be a conductive material, having an insulating coating along its entire surface except for conductive area 100 and forward end 98. The length of conductive area 100 should be small relative to the possible length of motion of connector 94. Contact 102 is provided in an interior wall of each hole 92. The distance between conductive area 100 and contact 102, when no force is applied to connector 94, is selected so that only when connector 94 is pushed a certain distance will conductive area 100 and contact 102 be in alignment. Contact 102 is electrically connected to a computer (not shown).

Figure 13:
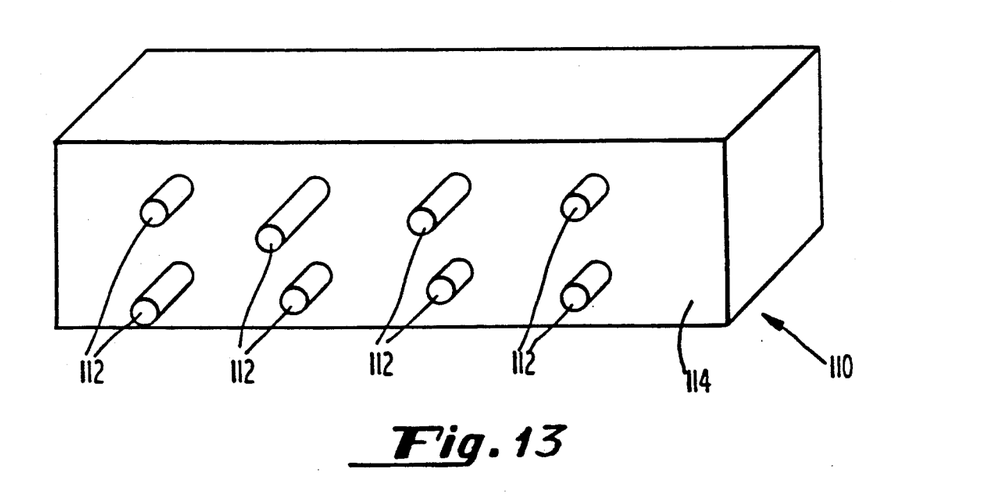
FIG. 13 is a perspective view of a connector according to the embodiment of FIG. 12.

FIG. 13 depicts a male connector according to the invention for use with the female connector of FIG. 12. Male connector 110 is shown. Male connector 110 has a number of cylindrical pins 112 extending from face 114 thereof. When male connector 110 is inserted in female connector 90, the ends of pins 112 will engage conductive forward ends 98 of connectors 94. Thus the end of each pin 112 has the function of an engaging member in the embodiment shown in FIG. 5. The end of each pin 112 is disposed a predetermined distance from the front, or face, of male connector 110. When pins 112 engage conductive forward ends 98 of connectors 94, electrical contact is established between a hardware unit to which male connector 110 is attached, and connector 94. If pins 112 are of the proper length, connectors 94 will be moved the proper distance to cause conductive areas 100 and contacts 102 to become aligned. Thus, electrical contact will be established between a hardware unit to which male connector 110 is attached and a hardware unit to which female connector 90 is attached.

This invention may also be used so as to provide only a supervisor with a disk drive. Individual workstations may be provided with a hard drive for storage of necessary programs. By not providing each user with a disk drive, the danger that a disk containing programs having viruses, or otherwise unacceptable data or programs, will be avoided. By providing the supervisor with a removable disk drive, it will be possible for the supervisor to update or add programs by going to each workstation, inserting the disk drive in the computer, inserting a disk containing the desired update of program in the disk drive, loading that update or program in the hard drive of the workstation, and then removing the disk and the disk drive.

Software techniques, such as are known in the prior art, may be combined with a system of the invention to provide additional security. Of course, numerous combinations of hardware units, in addition to disk drives and computers, may be protected using the system of the invention.

It will be appreciated that there are considerable variations that can be accomplished in an apparatus of the invention without departing from its scope. As a result, although a preferred embodiment of an apparatus of the invention has been described above, it is emphasized that the invention is not limited to a preferred embodiment and there exist alternative embodiments that are fully encompassed within the invention's scope, which is intended to be limited only by the scope of the appended claims.

What is claimed is:

1. A system for allowing only identified first computer hardware units to be connected to a second computer hardware unit, comprising:
   (a) a first connector on each of said identified first computer hardware units, having a plurality of engaging members, each one of said engaging members at a predetermined position a predetermined distance from the front of said first connector, which set of predetermined positions identifies each said first computer hardware unit;
   (b) a second connector on said second computer hardware unit, having a plurality of spring-loaded contact members, each of which is located so as be engaged by one of said engaging members, wherein electrical contact between one of said first computer hardware units and said second computer hardware unit is established only when each of said spring-loaded protrusions is moved a predetermined distance by one of said engaging members and is not established when at least one of said spring-loaded contact members is moved in excess of said predetermined distance.

2. A system as recited in claim 1, wherein said first connector comprises a substantially flat board having a plurality of conductor surfaces on at least one surface thereof, said engaging members being recessed between adjacent ones of said conductor surfaces.

3. A system as recited in claim 2, wherein:
   (a) each of said spring-loaded contact members comprises:
      (i) a first conductive area adapted to be placed in electrical contact with one of said conductive surfaces when said first connector is inserted; and
      (ii) a second conductive area, which cannot be placed directly in electrical contact with a conductor surface on said first connector, which second conductive area is in electrical contact with said first conductive area, a dimension of said second conductive area in the direction of motion of said spring-loaded contact member being small in relation to the possible length of motion of said spring-loaded contact members; and
   (b) said second connector comprises a contact connector corresponding to each one of said spring-loaded contact members, each said contact connector being adapted to come in electrical contact with said second conductive area only when the length of motion of said spring-loaded contact member is equal to said predetermined distance, said contact connector being in permanent electrical contact with said second computer hardware unit.

4. A system as recited in claim 3, wherein said first conductive area is on one side of said spring-loaded contact member, and said second conductive area is on an opposite side of said spring-loaded contact member from said first conductive area.

5. A system as recited in claim 1, wherein said first connector comprises a plurality of pins of predetermined lengths, wherein an end of each one of said pins is an engaging member.

6. A system as recited in claim 5, wherein:
   (a) each of said spring-loaded contact members comprises a cylinder having a conductive end toward a face of said second connector, and a conductive area along a side of said cylinder, which conductive area is in electrical contact with said conductive end, a dimension of said conductive area in the direction of motion of said cylinder being small in relation to the possible length of motion of said cylinder; and
   (b) said second conductor comprises a contact connector corresponding to each of one of said cylinders, each said contact connector being adapted to come in electrical contact with said conductive area only when the length of motion of said cylinder is equal to said predetermined distance, said contact connector being in permanent electrical contact with said second computer hardware unit.

* * * * *